United States Patent
Garoff et al.

(10) Patent No.: US 10,626,523 B2
(45) Date of Patent: Apr. 21, 2020

(54) FIBER AND A PROCESS FOR THE MANUFACTURE THEREOF

(71) Applicant: Stora Enso OYJ, Helsinki (FI)

(72) Inventors: Niklas Garoff, Hägersten (SE); Robert Protz, Potsdam (DE); Jens Erdmann, Saarmund (DE); Johnannes Ganster, Potsdam (DE); André Lehmann, Potsdam (DE)

(73) Assignee: Stora Enso OYJ, Helsinki (FI)

(*) Notice: Subject to any disclaimer, the term of this patent is extended or adjusted under 35 U.S.C. 154(b) by 0 days.

(21) Appl. No.: 15/580,826

(22) PCT Filed: Jun. 9, 2016

(86) PCT No.: PCT/IB2016/053401
§ 371 (c)(1),
(2) Date: Dec. 8, 2017

(87) PCT Pub. No.: WO2016/199060
PCT Pub. Date: Dec. 15, 2016

(65) Prior Publication Data
US 2018/0163326 A1    Jun. 14, 2018

(30) Foreign Application Priority Data

Jun. 11, 2015   (SE) .................................. 1550794

(51) Int. Cl.
*D01F 9/17*    (2006.01)
*D01D 10/02*   (2006.01)
(Continued)

(52) U.S. Cl.
CPC ............... *D01F 9/17* (2013.01); *C01B 32/05* (2017.08); *C08B 16/00* (2013.01); *C08L 1/02* (2013.01);
(Continued)

(58) Field of Classification Search
CPC ...... D01F 9/17; D01F 9/16; D01F 2/00; D02J 1/221; D02J 1/22; C08L 97/005;
(Continued)

(56) References Cited

U.S. PATENT DOCUMENTS 3,461,082 A    8/1969  Otani et al.
3,716,331 A    2/1973  Schalamon et al.
(Continued)

FOREIGN PATENT DOCUMENTS

CN    103748271    4/2014
CN    104593906    5/2015
(Continued)

OTHER PUBLICATIONS

Otani, Sugio, et al. "High modulus carbon fibers from pitch materials." Bulletin of the Chemical Society of Japan 45.12 (1972): 3710-3714.*
(Continued)

*Primary Examiner* — Richard M Rump
(74) *Attorney, Agent, or Firm* — Greer, Burns & Crain, Ltd.

(57) ABSTRACT

The present invention relates to a method for manufacturing thermally stabilized, non-sticky and stretchable fibers, which may be further processed into intermediate carbon fibers and finally also carbon fibers. Uses of said fibers are also disclosed. Also a highly oriented intermediate carbon fiber is disclosed together with a highly oriented carbon fiber.

14 Claims, 4 Drawing Sheets

Processing line for producing highly oriented intermediate carbon fibers

(51) Int. Cl.
  *D01F 2/00*   (2006.01)
  *D01F 9/16*   (2006.01)
  *C08B 16/00*  (2006.01)
  *D02J 1/22*   (2006.01)
  *C08L 1/02*   (2006.01)
  *C08L 97/00*  (2006.01)
  *C01B 32/05*  (2017.01)
  *D01D 5/06*   (2006.01)

(52) U.S. Cl.
  CPC .............. *C08L 97/005* (2013.01); *D01D 5/06* (2013.01); *D01D 10/02* (2013.01); *D01F 2/00* (2013.01); *D01F 9/16* (2013.01); *D02J 1/22* (2013.01); *D02J 1/221* (2013.01)

(58) Field of Classification Search
  CPC ......... C08L 1/02; C01B 32/05; C01B 32/158; C01B 32/159; D01D 5/06; D01D 10/02; C08B 16/00
  See application file for complete search history.

(56) References Cited

U.S. PATENT DOCUMENTS

| | | | | |
|---|---|---|---|---|
| 4,005,183 | A * | 1/1977 | Singer | .................... D01F 9/145 208/44 |
| 4,610,860 | A * | 9/1986 | Mullen | .................... D01F 9/32 264/29.2 |
| 5,344,921 | A * | 9/1994 | Sudo | ....................... C08H 6/00 530/500 |
| 7,226,639 | B2 | 6/2007 | Olry et al. | |
| 8,591,859 | B2 * | 11/2013 | Leon y Leon | .......... D01F 9/225 423/447.6 |
| 2014/0038034 | A1 | 2/2014 | Rios et al. | |
| 2014/0099505 | A1 | 4/2014 | Thunga et al. | |
| 2014/0219909 | A1 | 8/2014 | Sjoholm et al. | |
| 2015/0078983 | A1 | 3/2015 | Hwang et al. | |

FOREIGN PATENT DOCUMENTS

| | | | |
|---|---|---|---|
| JP | H04272234 A | 9/1992 | |
| JP | 3852631 | 12/1998 | |
| JP | H11217734 A | 8/1999 | |
| JP | 2003516478 A | 5/2003 | |
| JP | 2005179794 A | 7/2005 | |
| JP | 2010031418 | 2/2010 | |
| JP | 2012026049 | 2/2012 | |
| JP | 2012082541 A | 4/2012 | |
| JP | 2012117162 | 6/2012 | |
| KR | 20120134503 | 12/2012 | |
| KR | 20140002991 | 1/2014 | |
| RU | 2045472 C1 * | 10/1995 | .............. D01F 9/16 |
| RU | 2394949 | 1/2009 | |
| RU | 2520982 | 6/2014 | |
| TW | I384098 | 2/2013 | |
| WO | 2012156443 | 5/2012 | |
| WO | 2012156441 | 11/2012 | |
| WO | 2014162062 | 10/2014 | |

OTHER PUBLICATIONS

English machine translation of KR20140002991 (2014).*
International Searching Authority, International Search Report, PCT/IB2016/053401, dated Aug. 31, 2016.
International Searching Authority, Written Opinion of the International Searching Authority, PCT/IB2016/053401, dated Aug. 31, 2016.
Kadla, J. F. et al., "Lignin-based carbon fibers for composite fiber applications," Carbon, vol. 40 (2002), pp. 2913-2920.
Song, Peng, "The Correlation Between Preparation Technology and Properties of PAN-Based Carbon Fiber," Apr. 15, 2013.
Supplementary European Search Report, EPO Application No. 16806992, dated Dec. 19, 2018.

* cited by examiner

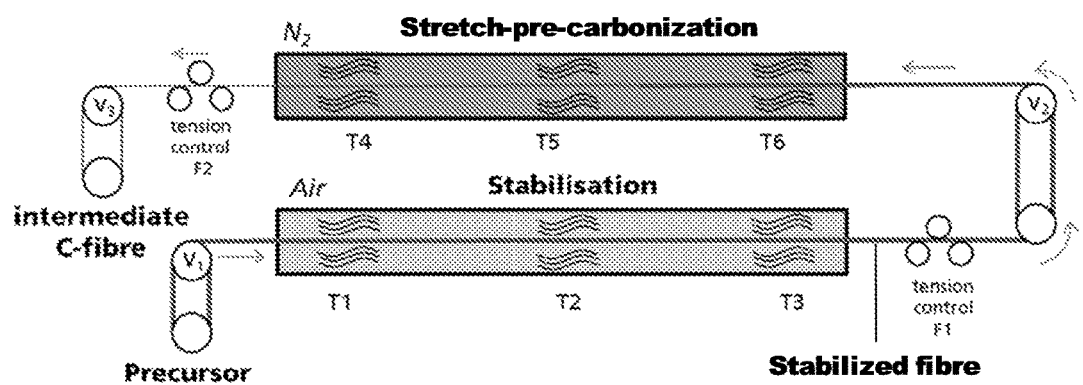
Figure 1: Processing line for producing highly oriented intermediate carbon fibers

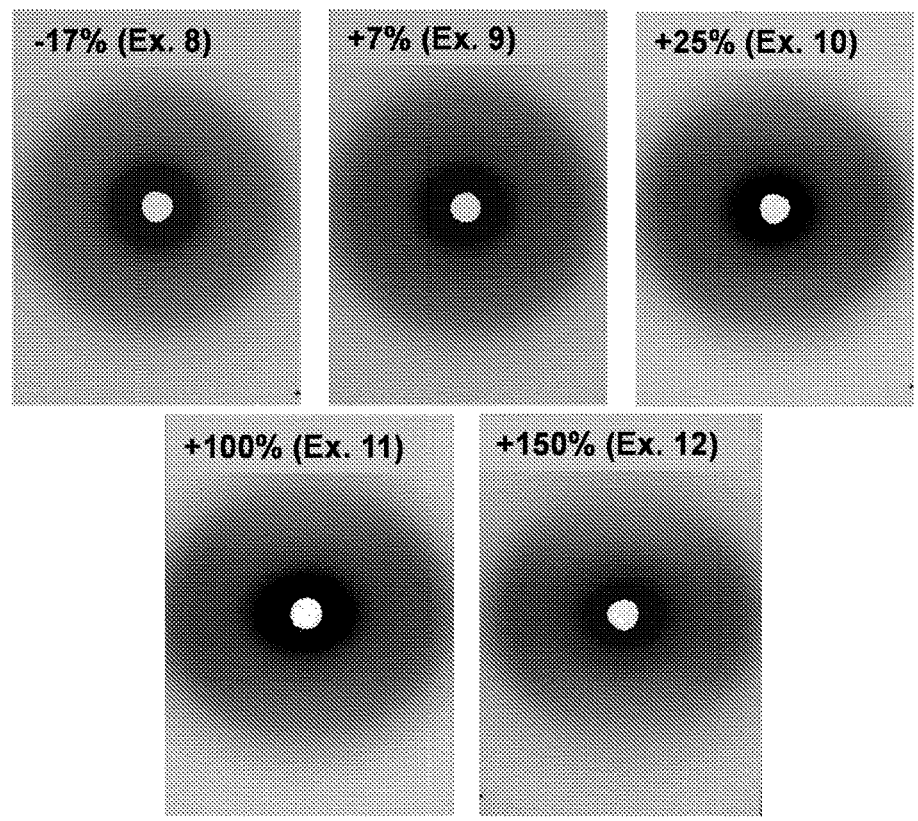
Figure 2: WAXS flat film photographs of intermediate carbon fibers examples 8-12, stretched in a range between -17% (free shrinkage) and 150% elongation. The data shows an increase in preferred orientation of the graphite-like structure along the fiber axis with increasing stretch.

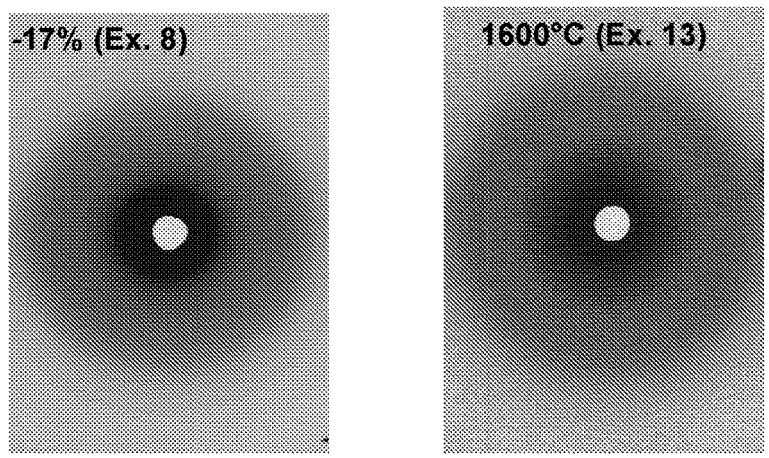
Figure 3: WAXS flat film photographs of intermediate carbon fiber produced with -17% stretch (example 8) and that of the corresponding carbon fiber (example 13). The figure shows that the structure of the unstretched intermediate carbon fiber and that of the carbon fiber are amorphous

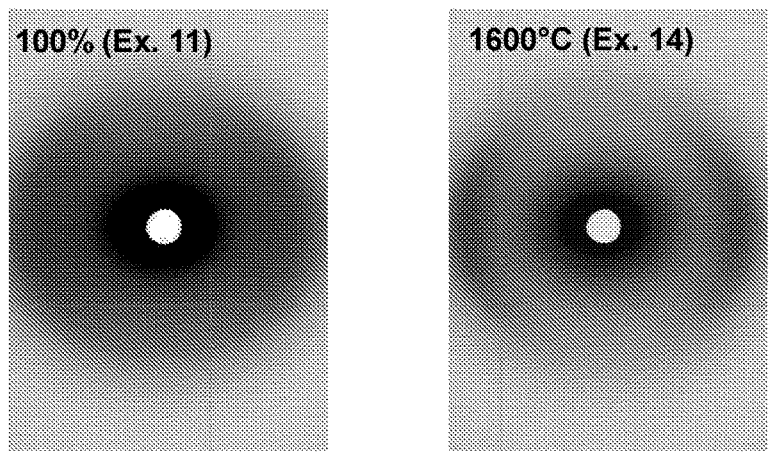
Figure 4: WAXS flat film photograph of intermediate carbon fiber produced with 100% stretch (example 11) and that of the corresponding carbon fiber (example 14). The figure shows that the structure of the stretched intermediate carbon fiber and that of the carbon fiber are oriented.

FIBER AND A PROCESS FOR THE MANUFACTURE THEREOF

This application is a U.S. National Phase under 35 U.S.C. § 371 of International Application No. PCT/IB2016/053401, filed Jun. 9, 2016, which claims priority under 35 U.S.C. §§ 119 and 365 to Swedish Application No. 1550794-0, filed Jun. 11, 2015.

FIELD OF INVENTION

The present invention relates to a process for the manufacture of endless filament yarns called hereafter thermally stabilized, non-sticky and stretchable fibers, based on a precursor containing cellulose and lignin. Those fibers are suitable for making intermediate carbon fibers. These intermediate carbon fibers may be provided with an oriented structure, through using additional steps obtained by, what is thought to be, plastic deformation of the said precursor in a temperature range of from 200° C. to 1300° C. The oriented structure obtained may be maintained during the subsequent carbonization process by using carbonization temperatures from 900° C. to 3000° C. for producing a final carbon fiber. Final carbon fibers based on highly oriented intermediate carbon fibers are characterized by significantly higher strengths (greater than 1000 MPa) and moduli (greater than 100 GPa) compared to final carbon fibers produced from intermediate carbon fibers lacking this orientation. The present invention also provides a highly oriented intermediate carbon fiber and also a highly oriented carbon fiber.

BACKGROUND

Production of carbon fiber starts with the manufacture of the so called precursor fiber. The ideal requirements for a carbon fiber precursor are that it should be easily converted to carbon fiber, give a high carbon yield and allowed to be processed economically. Other important requirements for precursor materials are spinnability i.e. the ability to form filaments, stretchability, i.e. the ability to stretch and align its molecular structure along the fiber direction and the ability to form a thermoset in the stabilization process i.e. to become infusible so that the individual filaments do not stick together. The sticking of filaments must be avoided because it causes surface defects and unequal diffusion during thermal conversion to carbon fiber leading to poor mechanical performance. The material must furthermore be able to maintain its stretched structure during thermal conversion to form linearly oriented graphite structures in the carbon fiber. Only few materials exhibit this combination of requirements.

About ninety-five percent of all carbon fibers are produced from poly-acrylonitrile (PAN). PAN has a continuous carbon backbone and nitrile groups that are ideally positioned for cyclization to occur, enabling the formation of a ladder polymer during stabilization, as a first stage towards the carbon structure of the final CF. The ability of PAN to maintain its oriented structure during stabilization is the key for PAN-based carbon fiber's excellent strength and stiffness. Carbon fiber out performs most other materials such as metals or glass fiber regarding mechanical properties but its high price is regarded as the main bottleneck that hinders its penetration into mass markets (such as automotive and wind energy). The high price is due to the high manufacturing costs of carbon fiber and in case of PAN-based carbon fiber the cost of the PAN precursor contributes to more than 50% to the total costs [1]. This motivates the development of alternative low-cost precursor concepts.

Precursors from melt-spun lignin and lignin derivatives and hybrid precursors from solvent-spun PAN and lignin (WO 2012003070 A1) are two important technology platforms under development. Typical target properties for these kinds of carbon fibers are 170 GPa tensile modulus and 1.7 GPa tensile strength [2], i.e. lower than the properties of commercial PAN-based carbon fibers. Lignin is a polyaromatic polyol and constitutes, after cellulose, the second largest material component in wood and other lignocellulosic plants. The amount of carbon in lignin is relatively high, approx. 60-65% and therefore lignin is regarded as a promising raw material for carbon fiber with respect to giving a high carbon yield. During chemical pulping cellulosic fibers are separated from softwoods, hardwoods, and annual plant biomass, for further processing to paper, board, tissue products and man-made cellulose fibers. Kraft pulping is the dominant chemical pulping process. Other processes include soda pulping, sulfite pulping (which gives lignosulfonates) and the organosolv process. In alkaline pulping (i.e. kraft and soda pulping), large quantities of lignin become dissolved in the alkaline pulping liquor, known as black liquor, a highly alkaline complex mixture containing used cooking chemicals, solubilized wood lignin, carbohydrates and organic acids. From there the lignin can be further processed to energy by combustion of the partly evaporated black liquor or, alternatively, be isolated, for example by precipitation using acid. The chemical structure of precipitated lignin is determined by the type of biomass used and the pulping method. Lignin may be melt-spun to filaments but such lignin fibers may have several disadvantages for usage as carbon fiber precursors. Lignin fibers easily melt during thermal conversion to carbon fiber. In order to achieve a thermoset material, i.e. an infusible non-sticky stabilized fiber for conversion into the final carbon fiber, the lignin precursor has to be stabilized at extremely low heating rates. Values are reported in the range between 0.05° C./min [3] up to 0.5° C./min [4]. Consequently, the total residence times during stabilization for reaching the final stabilization temperature of typically 250° C., range from 7.5 h to 75 h (see table 1). Such long stabilization times hamper the competitiveness of lignin-based carbon fibers. For comparison, PAN precursors are exposed to stabilization times of about 1.5 hours. Another report states stabilization rates for monofilament fibers from low-molecular weight softwood lignin of 15° C./min [5]. The stickiness of a multifilament yarn during stabilization was not studied in that report. Fibers were interpreted as fully stabilized when they no longer showed any glass transition point as measured by differential scanning calorimetry or melting point under thermal treatment in a melting point microscope. The carbonization rate was 3° C./min up to the final carbonization temperature of 1000° C./min, leading to a total carbonization time of 250 minutes, i.e. far longer than the carbonization times for commercial carbon fiber manufacture that is in the range of a few minutes.

WO 2012003070 describes a method for the manufacture of dopes containing poly-acrylonitrile (PAN) and lignin for the production of carbon fiber precursors via solvent spinning. Also for this concept, filament stickiness during thermal conversion of the precursor to carbon fiber has been reported [2].

Lignin precursor fibers are characterized by an extremely brittle behavior and low mechanical properties (30 to 35 MPa tensile strength and 0.5 to 1% elongations-at-break) throughout the whole temperature range between room temperature and 300° C. [6]. The literature does not report on a successful continuous conversion of lignin precursors to carbon fiber, only batch-wise conversion. The most probable explanation is that lignin fibers cannot withstand the mechanical stresses during continuous production caused by fiber transportation (via rollers), stretching and winding/unwinding. Cellulose-precursors, by contrast, have higher mechanical performance. The subsequent stabilization of the cellulose precursor, however, is associated with a very high yield loss and depolymerization. Two competing reactions occur at 250-300° C. The desired dehydration of cellulose chains and the unwanted generation of levoglucosan and simultaneous depolymerization [7]. The stabilized cellulose fiber is much weaker than the original precursor [8 (p. 15)], [9] and cannot be stretched during stabilization. Stretch graphitization at temperatures between 2500° C. and 3000° C. must be applied in order to form oriented graphite domains for high mechanical performance [8] which causes a poor material yield (typically 10-20%). The high temperatures needed and the poor material yield lead to high production costs for cellulose-based carbon fiber.

The industrial production of carbon fibers started in 1963. At the time C. E. Ford and C. V. Mitchell from Union Carbide developed and patented a continuous method for manufacturing carbon fibers from cellulosic man-made precursors [10]. In 1964, carbon fibers with the trade name »Thornel 25« having strengths of 1.25 GPa and moduli of 172 GPa were introduced to the market. Later on »Thornel 50«, »Thornel 75«, and »Thornel 100« followed. The latter had strengths of 4.0 GPa and moduli of 690 GPa. This excellent property profile could however only be obtained through stretch-graphitization at temperatures between 2500° C. and 3000° C. Only at these high temperatures, a plastic deformation is possible for a cellulose-based precursor yielding high orientations and thus a carbon fiber with competitive mechanical properties. This manufacturing process was costly and associated with low carbon yields in the range between 10 and 20%. This led to the complete cessation of carbon fiber manufacture from cellulosic man-made precursors for reinforcing applications. This comedown is closely related to the development of PAN-based carbon fibers which can be manufactured in a more cost-competitive way with similar mechanical properties. Without the expensive stretch graphitization step carbon fibers based on cellulose-based precursors attain only inferior mechanical properties with moduli in the range of 40 GPa [9] to 97 GPa [11] and tensile strength from 160 MPa [12] to 1.1 GPa [11] preventing this kind of fiber from being competitive for structural applications.

A further method for the manufacture of carbon fiber is disclosed in DE1952388.

Also in US20150078983 a method for the manufacture of a carbon fiber is disclosed which involves cellulose fibers.

Cellulose is a lower cost raw material than PAN and, in contrast to PAN, a renewable raw material. However, the high yield loss and the high energy input needed during stretch-graphitization of cellulose make the manufacture of cellulose-based carbon fiber not competitive.

The present invention addresses the problems of carbon fiber production that are related to stretching and generation of orientation. Thus, the problem to be solved is to convert cellulose-based precursor cost efficiently to high-performing carbon fiber or precursors thereof.

It has now surprisingly been found, that by using a certain method, involving the addition of lignin or lignin derivate to the cellulose, a stabilization step and a stretch-pre-carbonization step, a highly-oriented intermediate carbon fiber can be provided. Said stabilization step also give rise to a thermally stabilized, non-sticky and stretchable fiber. Said intermediate carbon fiber is provided with such properties that alleviate or even solve one or more of the problems connected with the manufacturing of carbon fibers from cellulose. Said intermediate carbon fiber can be converted to a highly-oriented carbon fiber. Furthermore, said carbon fiber is completely based upon renewable resources.

SUMMARY OF INVENTION

The present invention thus solves one or more of the above problems, by providing according to a first aspect a highly oriented intermediate carbon fiber having a Modulus, i.e. elastic modulus, (of Intermediate Carbon-fiber) of from about 40 to about 60 GPa. Said intermediate carbon fiber may be made using a method as set out in the fourth aspect as set out below.

Also provided according to a second aspect of the invention is a highly oriented carbon fiber having an elastic modulus of at least about 100 GPa, and preferably also a tensile strength of at least about 1.1 GPa. Said carbon fiber may be made using a method as set out in the eighth aspect as set out below.

Also provided according to a third aspect of the invention is a method for manufacturing a thermally stabilized, non-sticky and stretchable fiber, suitable for making an intermediate carbon fiber, comprising the following steps:
a) providing cellulose and/or a cellulose derivative,
b) providing lignin and/or a lignin derivative,
c) dissolution of said components followed by subsequent mixing thus providing a dope,
d) performing a solution spinning of the dope to a precursor material, and
e) performing a stabilization, thus providing a thermally stabilized, non-sticky and stretchable fiber.

Also provided according to a fourth aspect of the invention is a method for manufacturing a highly oriented intermediate carbon fiber involving the above steps and also comprising a subsequent step:
f) performing a stretch-pre-carbonization, thus providing a highly oriented intermediate carbon fiber.

Also provided according to a fifth aspect of the invention is a thermally stabilized, non-sticky and stretchable fiber obtainable by the method according to the third aspect.

Also provided according to a sixth aspect of the invention is a highly oriented intermediate carbon fiber obtainable by the method according to the fourth aspect.

Also provided according to a seventh aspect of the invention is use of the fibers according to the first, fifth and sixth aspect for the manufacture of carbon fibers.

Also provided according to an eighth aspect is a method for manufacturing a highly oriented carbon fiber comprising the following steps
g) providing a highly oriented intermediate carbon fiber according to the first or sixth aspect,
h) performing a carbonization step, and optionally
i) performing a graphitization step, thus providing a highly oriented carbon fiber.

Also provided according to a ninth aspect is a highly oriented carbon fiber obtainable by the method according to the eighth aspect.

Also provided according to an tenth aspect is use of the highly oriented carbon fiber according to the second or ninth aspect in the manufacture of carbon fiber-reinforced composites for applications such as appliances, automotive parts, wind turbine rotor blades or airplane parts. Thus said carbon fiber may be used in the manufacture of appliances, automotive parts or aeronautical parts.

DETAILED DESCRIPTION OF THE INVENTION

It is intended throughout the present description that the expression "lignin" embraces any lignin which may be used for making a carbon fiber or precursors thereof. Examples on said lignin are, but are not limited to softwood lignin, hardwood lignin, lignin from one-year plants or lignins obtained through different pulping methods such as, organosolv pulping or kraft pulping. The lignin may e.g. be isolated by using the process disclosed in EP 1794363. The term "lignin" also encompasses native lignin in biomass.

It is intended throughout the present description that the expression "cellulose" embraces any type of cellulose, such as cellulose fibers and cellulose materials. The cellulose may also be a microfibrillated cellulose (MFC). The cellulose may be bleached or unbleached. The cellulose may also be crystalline cellulose, MCC (microcrystalline cellulose); it may have a high purity due to its potential use in pharmaceutical compositions or other medical uses. The cellulose may be bacterial nanocellulose (BNC) or nanocrystalline cellulose (NCC); it may be used in electrical applications and have magnetical properties. The cellulose may be man-made synthetic polymer fibers and fibers made from dissolving pulp. The cellulose may have its origin from of a pulp, which may be chemical pulp, mechanical pulp, thermomechanical pulp or chemi(thermo)mechanical pulp (CMP or CTMP). The pulp may consist of pulp from hardwood, softwood or both types. The pulp may e.g. contain a mixture of pine and spruce or a mixture of birch and spruce. The chemical pulps that may be used in the present invention include all types of chemical wood-based pulps, such as bleached, half-bleached and unbleached sulphite, kraft and soda pulps, and mixtures of these. The pulp may be a dissolving pulp. The pulp may also comprise textile fibers. The pulp may also be based on one-year plants (e.g. bagasse, bamboo, switchgrass). The pulp may also be nanopulp comprised of nanocellulose fibers. Also combinations of said pulp types are possible in the context of the present invention. The pulp may also contain synthetic fibers or biofibers such as PLA (Poly-lactic acid). Said cellulose may be converted into a cellulose derivative. It is intended throughout the present description that the expression "cellulose derivate" embraces any type of fiber-forming cellulose derivate, in particular 1) cellulose carbamate, 2) cellulose ethers with low degree of substitution, in particular methyl (CMC) or ethyl cellulose (with substitution degree <0.2) also hydroxyl ethyl cellulose and hydroxyl propyl cellulose with molecular substitution of lower that 0.3, 3) cellulose allophanate and hemicellulose and/or mixtures thereof.

The solution spinning of the dope to a precursor material of step d) in the third aspect of the present invention may be performed via techniques known to a person skilled in the art such as via wet spinning or dry jet-wet spinning. According to a further preferred embodiment of the third aspect of the invention the stabilization is performed at a temperature from about 100 to about 450° C., preferably from about 200 to about 350° C., most preferred from about 220 to about 300° C., wherein the stabilization is done at a residence time of from 10 to 180 minutes, preferably from 20 to 80 minutes.

According to a further preferred embodiment of the third aspect of the invention the precursor material containing cellulose and/or cellulose derivative and lignin and/or lignin derivative, has a content of lignin and/or lignin derivative at a maximum amount of 99 wt %.

According to a further preferred embodiment of the third aspect of the invention the precursor material contains from about 1% to 99% lignin or lignin derivative, preferably from 10% to 60% lignin or lignin derivative, most preferred from 15% to 55% lignin or lignin derivative.

According to a further preferred embodiment of the third aspect of the invention heating rates up to 200° C./min are applied in the stabilization step.

According to a further preferred embodiment of the fourth aspect of the invention, the molecular orientation in the carbon fiber is realized by stretching the fiber during the stretch-pre-carbonization up to 10-fold at a temperature below 1300° C., preferably below 1100° C., most preferred below 1000° C.

According to a further preferred embodiment of the fourth aspect of the invention the pre-stretch carbonization is carried out at temperatures from about 200 to about 1300° C., preferably from 250 to 1100° C., most preferred from 300 to 900° C.

According to a further preferred embodiment of the fourth aspect of the invention the stretch-pre-carbonization is performed during a residence time from 1 to 90 minutes, preferably from 3 to 60 minutes and most preferred from 5 to 30 minutes.

According to a further preferred embodiment of the fourth aspect of the invention said stretching is carried out at elongations between 10% and 1000%, preferably between 10% and 500%, most preferred between 10% and 300%.

According to a further preferred embodiment of the eighth aspect of the invention the carbonization is performed at a temperature from 900 to 2000° C., preferably from 1200 to 1800° C., most preferred in an inert gas such as nitrogen, and the optionally subsequent graphitization is performed at a temperature from 2000° C. to 3000° C.

According to a preferred embodiment of the eighth aspect a method for manufacturing a highly oriented carbon fiber is provided comprising the following steps:
1) providing cellulose and/or a cellulose derivative,
2) providing lignin and/or a lignin derivative,
3) dissolution of said components followed by subsequent mixing thus providing a dope,
4) performing a solution spinning of the dope to a precursor material,
5) performing a stabilization, thus providing a thermally stabilized, non-sticky and stretchable carbon fiber,
6) performing a stretch-pre-carbonization, thus providing a highly oriented intermediate carbon fiber,
7) performing a carbonization step, and optionally, performing a graphitization step, thus providing a highly oriented carbon fiber.

Thus the present invention relates to the manufacture of highly oriented carbon fibers from cellulose precursor fibers and avoids the two significant drawbacks of the classical method, viz. the costly stretch graphitization and the low carbon yield.

According to the present invention this is accomplished by mixing lignin or lignin derivatives with the cellulose or cellulose derivative.

The present invention also relates to a method for the continuous and cost-efficient production of thermally stabilized, non-sticky and stretchable endless multifilament yarns from precursors containing lignin and cellulose.

Surprisingly, the said lignin-cellulose precursor yarns can withstand fast heating rates during stabilization without sticking of the individual filaments and without melting.

Surprisingly, residence times of 60 minutes or shorter for the entire conversion process from precursor to carbon fiber may be realized. The yarn treated in that way has a tensile strength in the range of 150-200 MPa and elongations at break between 3 and 5% i.e. more than three times higher than the values reported for lignin precursors ([6], see table 1). Surprisingly, the fibers stabilized according to this method are strong enough to withstand the mechanical stresses during the subsequent process steps such as winding/unwinding, fiber transportation (via rollers) and stretching, without difficulties, like stabilized PAN fibers. This is a prerequisite for enabling a cost-efficient and continuous manufacturing process from precursor to final carbon fiber. Surprisingly, the said stabilized fiber based on a precursor from cellulose and lignin has much higher tensile strength and elongation-at-break than a stabilized precursor fiber from either lignin or cellulose (see table 1). Surprisingly, said stabilized fiber can be stretched in a subsequent stretch-pre-carbonization step. The thermally stabilized fiber manufactured according to the method described in this invention is suited for the subsequent conversion to carbon fibers with tensile strengths and moduli above 1 GPa and 100 GPa, respectively.

Literature reports carbon yields of about 40% for the manufacture of carbon fiber from lignin-based precursor [13]. Qin and Kadla report a carbon yield of 46% for the manufacture of carbon fiber from lignin [4]. Carbon yields of about 21% to 24% are reported for carbon fibers from viscose fibers and Tencel fibers [12] (for a relevant comparison the values of "non-pretreated" precursors fibers are referred to). In our case, the conversion of the cellulose-based precursor (example 2) to carbon fiber gave a carbon yield of 10%. Mathematically, the conversion of a precursor comprised of 50% cellulose and 50% lignin to carbon fiber should result in a carbon yield of 25-35%. Surprisingly, a higher carbon yield is obtained. Carbon yield is increased from 10% for lignin-free cellulose systems (see example 2) to 40% for a system containing 50% cellulose and 50% lignin (see example 1). This is thought to be attributed to a protecting effect of the lignin component on the cellulose that decreases the thermal decomposition of cellulose.

Moreover, a stretch-induced orientation, which is crucial for attaining good mechanical properties of the carbon fiber, can surprisingly be realized already at temperatures as low as 200 to 1300° C., in contrast to 2500-3000° C. for the lignin-free cellulose system. This is attributed to a plasticizing effect of the lignin component on cellulose. An intermediate carbon fiber may thus be obtained with a carbon content of <90 mol % and a high degree of molecular orientation. A subsequent carbonization step can be performed energy efficiently at moderate temperatures such as from 1200° C. to 1800° C. resulting in a final carbon fiber with carbon content >95%. Surprisingly, the orientation generated during the formation of the intermediate carbon fiber is maintained in the final carbon fiber. These carbon fibers have significantly higher strengths and moduli compared to carbon fibers produced from intermediate carbon fibers lacking this orientation.

Preferred features of each aspect of the invention are as for each of the other aspects mutatis mutandis. The prior art document(s) mentioned herein are incorporated to the fullest extent permitted by law. The invention is further described in the following examples, together with the appended figures, which do not limit the scope of the invention in any way. Embodiments of the present invention are described as mentioned in more detail with the aid of examples of embodiments, together with the appended figures, the only purpose of which is to illustrate the invention and are in no way intended to limit its extent.

FIGURES

FIG. 1 discloses a processing line for producing highly oriented intermediate carbon fibers.

FIG. 2 discloses WAXS flat film photographs of intermediate carbon fibers examples 8-12, stretched in a range between −17% (free shrinkage) and 150% elongation. The data shows an increase in preferred orientation of the graphite-like structure along the fiber axis with increasing stretch.

FIG. 3 shows a WAXS flat film photograph of intermediate C-fiber produced with −17% stretch (example 8) and that of the corresponding carbon fiber (example 13)

FIG. 4 shows a WAXS flat film photograph of intermediate C-fiber produced with 100% stretch (example 11) and that of the corresponding carbon fiber (example 14). From FIGS. 3 and 4 it can be concluded that the degree of orientation in the final carbon fiber corresponds to the degree of orientation in the preceding intermediate carbon fiber, with the difference that the arc position is now at the angle characteristic for graphitic reflections.

EXAMPLES

A multifilament yarn containing cellulose and lignin produced according to the method described in WO2012156441A1 was used as precursor. The said precursor was thermally stabilized in a stabilization step to render it infusible according to the method described in the present invention. The precursor was thus heated to temperatures between 200 and 300° C. at heating rates of up to 200° C./min at residence times between 20 to 80 minutes. The resulting stabilized filament yarn is characterized in that it is a thermoset, i.e. not meltable and that its filaments do not stick together. Furthermore, the stabilized filament yarn is characterized in that it is strong enough to withstand the mechanical stresses induced during the subsequent process steps involved during continuous conversion to carbon fiber, such as winding/unwinding, yarn transportation and stretching. Surprisingly, the said stabilized fiber based on a precursor from cellulose and lignin has much higher tensile strength and elongation-at-break than a stabilized precursor fiber from either lignin or cellulose (see table 1). Surprisingly, in contrast to stabilized fibers from cellulose precursors, the stabilized carbon fiber according to this invention is stretchable.

The stabilization was performed in a continuous mode by transporting the multifilament yarn through a tubular furnace with orifices at both ends. An appropriate mechanical tension applied at the ends of the furnace that prevents the yarn from contact with the surface. The yarn passes freely through the furnace with high process stability.

According to this invention, the stabilized multifilament yarn was transformed in the subsequent step, hereafter called stretch-pre-carbonization, into the so-called highly oriented intermediate carbon fiber at temperatures between 300 and 900° C. in an inert gas such as nitrogen with residence times between 5 and 30 minutes. Surprisingly and contrary to what is known to those skilled in the art, the stabilized cellulose-containing filament yarn can be stretched appreciably by applying an appropriate fiber tension. The degree of stretch correlates with the degree of orientation in the resulting intermediate carbon fiber (see FIG. 2). Surprisingly, the ability of the yarn to be stretched, i.e. its stretchability, and thus the final carbon fiber properties are highly influenced by the process conditions, i.e. the temperatures and residence times, during the stabilization step as shown in table 2.

In the carbonization step the final carbon fiber is obtained as the intermediate carbon fiber is thermally treated at temperatures between 900 and 2000° C. in an inert gas such as nitrogen, preferably between 1200 to 1600° C. which is accompanied by an increase in carbon content to at least 98%. Tensile strength and modulus of the carbon fiber increase with the degree of order generated during the stretch-pre-carbonization step.

Example 1

An endless, continuous precursor yarn consisting of 210 filaments and comprised of 50 wt % cellulose and 50 wt % lignin was produced according to the method described in patent publication WO2012156441A1.

Specifically, the cellulose and lignin were mixed with N-methylmorpholine-N-oxide hydrate and heated at 90° C. at 50 mbar until a NMMO content of at least 87% was attained and the dope was formed. In an air-gap spinning apparatus the dope was transferred to the spinning pump by a single screw-extruder. The throughput as well as drawing from the nozzle was adjusted so that total fineness of the final single-filament was 7-8 dtex. The dope was spun using a nozzle having 70 holes with diameters of 0.1 to 0.25 mm. A 40 mm air gap was realized between the nozzle and the coagulation bath. A constant air flow in the air gap was supplied to discharged dope. The multifilament was coagulated in the coagulation bath and passed through a washing bath filled with hot water followed by washing with distilled water using three Nelson Type rollers. The multifilament yarn was dried in a 2-stage drying roll to obtain lignin-cellulose containing precursors. Three 70 multifilament precursor reels were combined to one 210 multifilament precursor reel.

Example 2

An endless, continuous multifilament precursor yarn consisting of 210 filaments and comprised of 100 wt % cellulose and was produced analogously to the method described in example 1.

Examples 3 to 7

The precursor from example 1 was transported continuously through two tubular furnaces as shown in FIG. 1. The stabilization step according to the present invention takes place in the lower furnace shown in FIG. 1. The atmosphere in the stabilization oven is a hot air stream with temperatures between 240 and 270° C. ($T_1$ to $T_3$ in FIG. 1). The multifilament precursor yarn is transported through the furnace such that residence times are between 20 and 80 minutes. After this treatment the precursor yarn is converted to a stabilized precursor yarn that is neither meltable nor fusible and free of filament sticking and that is stretchable. By varying the fiber speed maintaining the condition $v_1=v_2$, various heating rates were realized (see table 1). Five different stabilized filament yarns (examples 3 to 7) were produced by varying final stabilization temperature and heating rate (see table 2).

TABLE 1

Behaviour of precursors with different lignin-to-cellulose ratios during stabilization at different stabilization conditions and the mechanical performance of the resulting stabilized fiber

| Precursor: lignin/cellulose wt/wt.-% | Heating rate up to 250° C. [° C./min] | Residence time stabilization [h] | Behaviour of precursors during stabilization | | | Mechanical Performance of the stabilized fiber | | |
|---|---|---|---|---|---|---|---|---|
| | | | Melting | Stickiness | Stretching | Modulus [GPa] | Strength [MPa] | Elongation [%] |
| 100/0* | 1.0 | 3.25 | Yes | Yes | No | — | — | — |
| | 0.5 | 7.5 | No | Yes | No | — | — | — |
| | 0.05 | 75 | No | Yes | No | 2.8 | 30 | 0.95 |
| | 0.025 | 150 | No | No | No | 2.9 | 31 | 1.0 |
| 50/50** | 10 | 1.0 | No | No | Yes | 8.9 | 150 | 3.5 |
| | 30 | 0.95 | No | No | Yes | 9.0 | 160 | 3.6 |
| | 50 | 0.90 | No | No | Yes | 8.8 | 150 | 3.4 |
| | 100 | 0.85 | No | No | Yes | 8.0 | 155 | 3.5 |
| 0/100*** | 30 | 0.95 | No | Yes | No | 12.0 | 50 | 1.5 |

*Literature data [6]
**Example 1
***Example 2

TABLE 2

Different stabilized lignin-cellulose multifilament yarns (examples 3-7) using precursor from example 1 that were stabilized using different stabilization profiles and the resulting stretchability of the stabilized fiber in the subsequent stretch-pre-carbonization step.

| Example | Stabilization temperature [° C.] | Heating rate [° C./min] | Stretch-pre-carbonization | | Resulting stretchability [%] |
|---|---|---|---|---|---|
| | | | $V_2$ [m/min] | $V_3$ [m/min] | |
| 3 | 270 | 30 | 0.034 | 0.029 | −17 free shrinkage |
| 4 | 260 | 29 | 0.034 | 0.037 | +7 |
| 5 | 250 | 28 | 0.034 | 0.043 | +25 |
| 6 | 245 | 27 | 0.034 | 0.068 | +100 |
| 7 | 240 | 27 | 0.034 | 0.086 | +150 |

Examples 8-12

In the next step, according to the invention, the stabilized fibers (examples 3 to 7) are treated in a stretch-pre-carbonization step. Stretch pre-carbonization is carried out at temperatures ($T_6$-$T_4$) between 300 and 900° C. in an inert gas such as nitrogen with residence times between 5 and 30 minutes. By adjusting the ratio of the velocities $v_3$ to $v_2$ of the respective godets various stretch ratios can be set (see table 2 and table 3). In this way five different multifilament intermediate carbon fibers with different levels of stretching were produced ranging from −17% (free shrinkage) to +150% elongation (examples 8-12). The elastic modulus of the intermediate carbon fibers increased with increased stretch (see table 3). Surprisingly, the attainable stretch ratios (i.e. the maximum stretches until filament breakage) strongly depend on the temperatures and residence times chosen in the stabilization step (see table 2).

FIG. 2 shows as mentioned the Wide angle X-ray scattering (WAXS) flat film photographs from these five examples. The figure clearly shows an increase in preferred orientation of the graphite-like structure along the fiber axis with increasing stretch. This explains the increased elastic modulus of the intermediate carbon fibers with increased stretch.

Examples 13-14

The intermediate carbon fibers from Example 8 (−17% stretch) was subsequently carbonized at 1600° C. to give a carbon fiber (example 13). Analogously, the intermediate carbon fiber from Example 11 (100% stretch) was carbonized at 1600° C. to give a carbon fiber (example 14). WAXS flat film photographs were taken from examples 13 and 14.

FIG. 3, as mentioned, shows a WAXS flat film photograph of intermediate C-fiber produced with −17% stretch (example 8) and that of the corresponding carbon fiber (example 13). FIG. 4 shows a WAXS flat film photograph of intermediate C-fiber produced with 100% stretch (example 11) and that of the corresponding carbon fiber (example 14). From FIGS. 3 and 4 it can be concluded that the degree of orientation in the final carbon fiber corresponds to the degree of orientation in the preceding intermediate carbon fiber, with the difference that the arc position is now at the angle characteristic for graphitic reflections.

TABLE 3

Applied stretch ratios in the stretch pre-carbonization step and the resulting moduli of the intermediate carbon fibers (examples 8-12).

| Example | Applied stretch [%] | Modulus of Intermediate C-fiber [GPa] |
| --- | --- | --- |
| 8 | −17 free shrinkage | 35 |
| 9 | +7 | 42 |
| 10 | +25 | 45 |
| 11 | +100 | 52 |
| 12 | +150 | 57 |

Example 15

An endless, continuous precursor yarn consisting of 210 filaments based on a dope having the composition of 7.7 wt % cellulose and 11.6% wt % lignin was produced according to the method described in patent publication WO2012156441A1.

The resulting precursor yarn was stabilized at 240° C. to a stabilized precursor yarn. The resulting stabilized precursor yarn was then treated in a stretch-pre-carbonization step at an applied stretch of 200% to give a highly oriented intermediate carbon fiber. This intermediate carbon fiber was then carbonized to a carbon fiber at 2000° C. at 0% stretch for 5 minutes. The resulting carbon fiber, thus a highly oriented carbon fiber, had an average elastic modulus of 100 GPa and an average tensile strength of 1.1 GPa with maximum values of 105 GPa for modulus and 1.27 GPa for tensile strength.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted compositions or methods may be combined with other known methods. Other aspects, advantages and modifications within the scope of the invention will be apparent to those skilled in the art to which the invention pertains.

REFERENCES

[1] Miller, C., oral presentation at: Go Carbon Fiber 2014, Oct. 8-10, 2014, Cologne, Germany
[2] Husman, G., "Development and Commercialization of a Novel Low-Cost Carbon Fiber," Report IM048, http://energy.gov/sites/prod/files/2014/07/f17/lm048_husman_2014_o.pdf, 2014
[3] Baker, D. A. et al., Journal of Applied Polymer Science, 124 (1), 2012, p. 227-234
[4] Qin, W. and J. F. Kadla, Journal of Applied Polymer Science 126 (S2), 2012. p. E204-E213
[5] Norberg et al., Journal of Applied Polymer Science, 128 (6), 2013, p. 3824-3830
[6] Uraki, Y. et al; Holzforschung 49 (4), 1995, p. 343-350
[7] Morgan, P. in: Carbon Fibers and their Composites, CRC Press 2005, p. 274
[8] Bacon R., Carbon fibers from Rayon Precursors, Chemistry and physics of carbon Vol 9, 1973
[9] Plaisantine, H. et al, Journal of Material Science, 41, 2006
[10] Ford, C. E. and Mitchell C. V., U.S. Pat. No. 3,107,152, 1963
[11] Peng, S. et al, Journal of applied Polymer Science, 90, 2003, p. 1941-1947
[12] Goldhalm, G., Lenzinger Berichte 90, 2012, p. 58-63
[13] Buchmeiser, M. et al, Angewandte Chemie, 126 (2014), p. 5364-5403.

The invention claimed is:

1. A method for manufacturing a highly oriented intermediate carbon fiber, comprising the following steps:
   a. providing cellulose and/or a cellulose derivative,
   b. providing lignin and/or a lignin derivative,
   c. dissolution of the cellulose and/or cellulose derivative and the lignin and/or lignin derivative followed by subsequent mixing thus providing a dope,
   d. performing a solution spinning of the dope to a precursor material,
   e. performing a stabilization on the precursor material at a temperature from about 100 to about 450° C. at a residence time of from 10 to 180 minutes, thus providing a thermally stabilized, non-sticky and stretchable fiber, and
   f. performing a stretch-pre-carbonization, including stretching and pre-carbonization, on the thermally stabilized, non-sticky and stretchable fiber at temperatures from about 200 to about 1300° C., thus providing a highly oriented intermediate carbon fiber, wherein said stretching is carried out at elongations between 25% and 1000%.

2. The method according to claim 1 wherein the precursor material containing cellulose and/or cellulose derivative and lignin and/or lignin derivative, has a content of lignin and/or lignin derivative at a maximum amount of 99 wt %.

3. The method according to claim 1 wherein the precursor material contains from about 1% to 99% lignin or lignin derivative.

4. The method according to claim 1 wherein heating rates up to 200° C./min are applied in the stabilization step.

5. The method according to claim 1 wherein the molecular orientation in the fiber is realized by stretching the fiber during the stretch-pre-carbonization up to 10-fold at a temperature below 1300° C.

6. The method according to claim 1 wherein the stretch-pre-carbonization is performed during a residence time from 1 to 90 minutes.

7. The method according to claim 1 wherein the stabilization is performed at a temperature from about 200 to about 350° C.

8. The method according to claim 1 wherein the precursor material contains from 10% to 60% lignin or lignin derivative.

9. The method according to claim 1 wherein the molecular orientation in the fiber is realized by stretching the fiber during the stretch-pre-carbonization up to 10-fold at a temperature below 1100° C.

10. The method according to claim 1 wherein the stretch-pre-carbonization is carried out at temperatures from 250 to 1100° C.

11. The method according to claim 1 wherein the stretch-pre-carbonization is performed during a residence time from 3 to 60 minutes.

12. The method according to claim 1 wherein said stretching is carried out at elongations between 25% and 500%.

13. The method according to claim 1 wherein the stabilization is performed at a temperature from about 220 to about 300° C.

14. The method according to claim 1 wherein the stabilization is performed for a residence time of 20-80 minutes.

* * * * *